United States Patent [19]
Harrington, III

[11] Patent Number: 5,226,236
[45] Date of Patent: Jul. 13, 1993

[54] NIPPER INCLUDING ANVIL HAVING LOCATOR HOOKS

[75] Inventor: John J. Harrington, III, Carlisle, Pa.

[73] Assignee: True Temper Hardware Company, Miamisburg, Ohio

[21] Appl. No.: 895,944

[22] Filed: Jun. 9, 1992

[51] Int. Cl.$^5$ .................... B26B 11/00; B26B 5/00; B26B 13/04

[52] U.S. Cl. .................................. 30/134; 30/131; 30/260

[58] Field of Search ............... 30/131, 135, 228, 260, 30/134; 56/328.1

[56] References Cited

U.S. PATENT DOCUMENTS

| | | | |
|---|---|---|---|
| 119,485 | 10/1871 | Warner | 30/135 |
| 454,473 | 6/1891 | Haussmann . | |
| 594,852 | 12/1897 | Brunell . | |
| 614,167 | 11/1898 | Gardella | 30/135 |
| 717,800 | 1/1903 | Bell . | |
| 1,322,085 | 11/1919 | Bertrand | 30/134 |
| 1,574,283 | 2/1926 | Gerfin | 30/260 |
| 1,681,746 | 8/1928 | Rauh . | |
| 1,901,739 | 3/1933 | Engel | 30/131 |
| 4,106,195 | 8/1978 | Berg | 30/260 |
| 4,246,698 | 1/1981 | Lasner et al. | 30/134 |
| 4,876,795 | 10/1989 | Chun-cheng . | |
| 5,117,557 | 6/1992 | Hartley . | |

Primary Examiner—Frank T. Yost
Assistant Examiner—Paul M. Heyrana, Sr.
Attorney, Agent, or Firm—Killworth, Gottman, Hagan & Schaeff

[57] ABSTRACT

A nipper for pruning sticks, stems and branches is provided with an anvil having locator hooks which partially block the jaw opening of a nipper to limit the size of sticks, stems and branches to be cut. The locator hooks further position sticks, stems and branches for cutting such that larger sizes are subjected to higher cutting forces, and are shaped to enhance retention of sticks, stems and branches for cutting.

17 Claims, 2 Drawing Sheets

NIPPER INCLUDING ANVIL HAVING LOCATOR HOOKS

BACKGROUND OF THE INVENTION

The present invention relates to a nipper for pruning plants and trees and, in particular, to a nipper whose anvil has locator hooks which capture and position objects to be cut depending on their size.

Nippers typically provide cutting action with a single blade against an anvil surface, and have been used in a wide variety of applications. It is a common experience for gardeners and others who use nippers for pruning to experience a stick, stem or branch sliding or squirting outward upon attempting to cut it by squeezing it between the blade and anvil. In addition, because a wide variety of stick, stem and branch sizes are typically presented during pruning, it is also a common experience for gardeners and others to encounter sticks, stems and branches which are too large to cut effectively with a particular nipper.

To provide restraint against movement, notches, such as semi-circular and v-shaped notches, in anvils, have long been used in other applications to locate articles in a fixed position for cutting. Other elements, such as removable clamps, have been used to rigidly position articles on anvils for cutting. With less precision, a stem stop element has been added to a jaw of a clipper to limit inward travel and generally block a stem outward in the jaws for cutting.

While such features have been effective in positioning or restraining articles for cutting in other applications, nippers for pruning plants and trees continue to lack effective means for restraining twigs, stems and branches for cutting, as well as, effective means to prevent engaging oversized twigs, stems and branches.

SUMMARY OF THE INVENTION

Those needs are satisfied by the present invention in which a nipper for pruning sticks, stems and branches is provided in its preferred embodiment with an anvil having locator hooks which partially block the jaw opening of a nipper, but moreover, serve to restrain and position twigs, stems and branches for cutting.

The nipper of the present invention includes opposing first and second jaws for engaging a stick, stem or branch for cutting. The first and second jaws define a jaw opening therebetween which has an open end and a closed end. The first jaw includes a cutting edge, while the second jaw includes an anvil having a receiving surface against which the cutting edge acts. The anvil further includes at least one locator lug, preferably shaped like a hook, which extends from the receiving surface into the jaw opening to partially block the jaw opening. The locator lug is spaced between the open and closed ends of the jaw opening and defines a first cutting area extending to the closed end. The hook-shaped locator lug has its curved surface facing the closed end of the jaw opening.

In operation, the locator lug of the nipper serves to permit only a stick, stem or branch of limited size to be admitted between the first jaw and the locator lug into said first cutting area, preventing oversized sticks, stems or branches which cannot be effectively cut from being engaged in the first cutting area between the first and second jaws. The locator lug further serves to restrain and position sticks, stems and branches which enter into the first cutting area for cutting. That is, sticks, stems and branches are prevented from squirting out during cutting. The hook shape helps to restrain twigs, stems or branches which may bias against it during cutting. As well, larger ones of those sticks, stems and branches are caused to extend further back into the jaw opening, so that, as is preferred, higher cutting forces are applied to the thicker and larger sticks, stems and branches.

Accordingly, it is an object of the present invention to provide locator lugs on the anvil of a nipper which serve to limit the size of sticks, stems and branches engaged in the first cutting area of the nipper. It is a further object of the present invention to restrain sticks, stems and branches which enter the first cutting area. It is a further object of the present invention to position larger sticks, stems and branches so that higher cutting forces are applied to larger sticks, stems and branches. It is a still further object of the present invention to provide two locator lugs shaped like hooks, with their curved surfaces facing the closed end of the jaw opening to restrain sticks, twigs and branches. It is a still further object of the present invention to provide an anvil having locator lugs which is a separate component of a nipper for use on one jaw. It is a still further object of the present invention to provide an anvil having locator lugs which is integral with the jaw of a nipper. These and other objects and advantages of the present invention will be apparent from the drawings and detailed description which follow.

DETAILED DESCRIPTION OF THE PREFERRED EMBODIMENT

Figure 1:
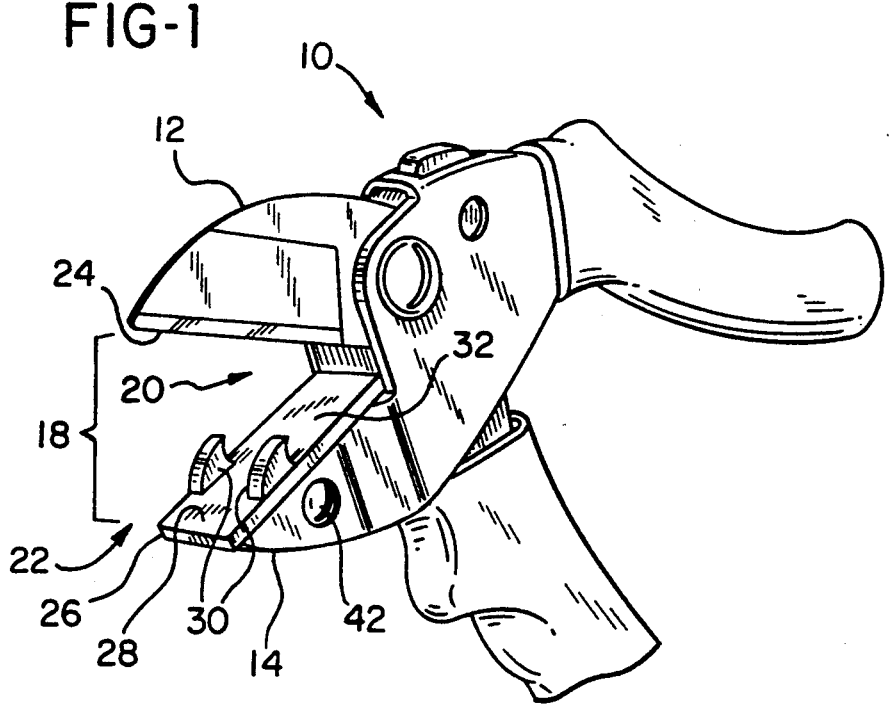
FIG. 1 is a perspective view of a nipper having an anvil in accordance with the present invention.
Figure 3:
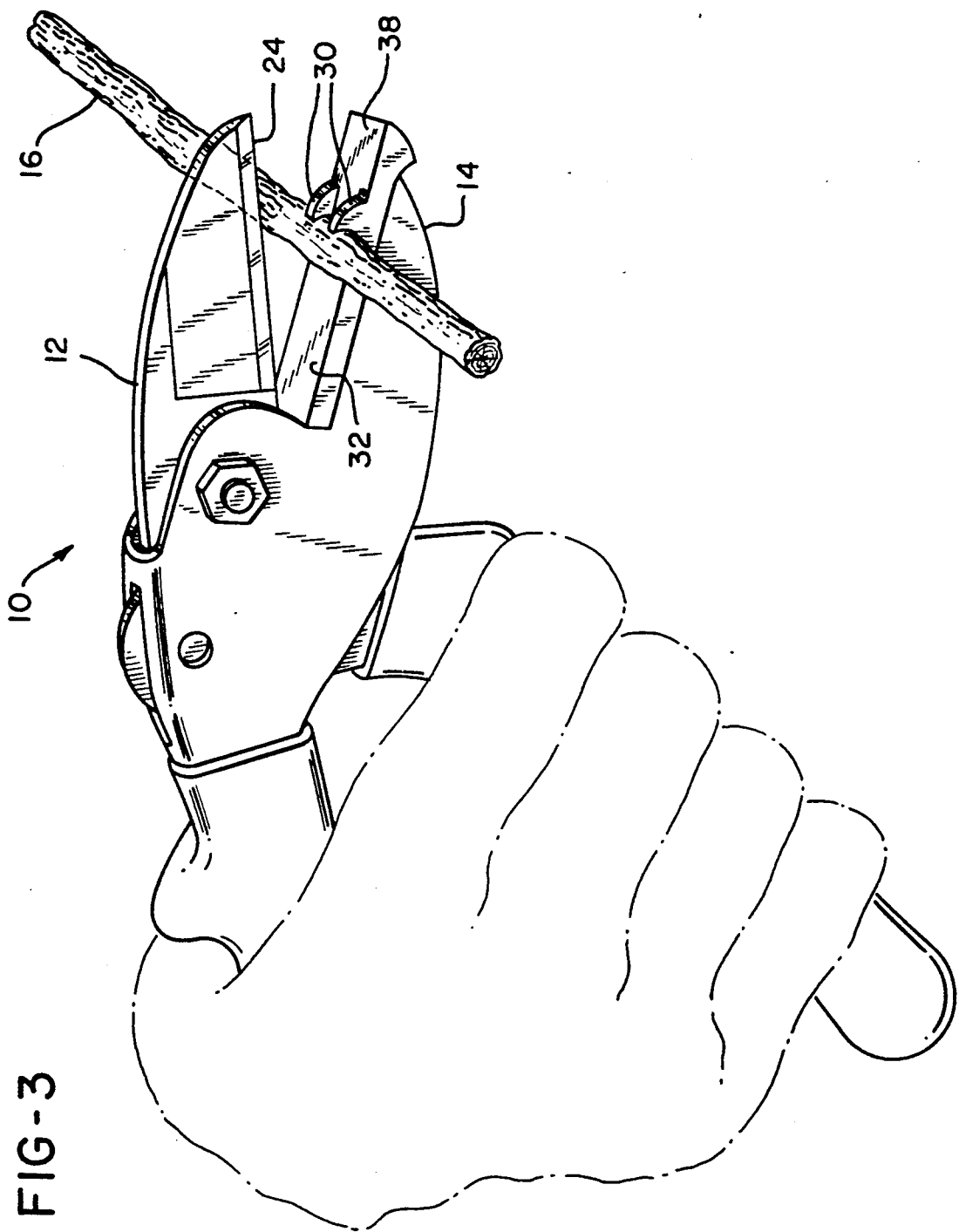
FIG. 3 is a perspective environmental view of a nipper having an anvil in accordance with the present invention integrally formed in a jaw.

Referring to FIGS. 1 and 3, a nipper 10 is shown having opposing first and second jaws 12, 14 which cooperate to engage a stick, stem or branch 16 for cutting. The first and second jaws 12, 14 define a jaw opening 18 having a closed end 20 and an open end 22 for receiving a stick, stem or branch 16. The first jaw 12 includes a cutting edge 24, while the second jaw 14 includes an anvil 26.

The anvil 26 includes a receiving surface 28 against which the cutting edge 24 acts. In accordance with the present invention the anvil 26 further includes at least one, and preferably two, locator lugs 30 which extend into the jaw opening 18 from the receiving surface 28 to partially block the jaw opening 18. The locator lugs 30 are spaced between the open and closed ends 22, 20 of the jaw opening 18 and define a first cutting area 32 which extends from the locator lugs 30 to the closed end 20 of the jaw opening 18. Where two locator lugs 30 are provided, as is preferred, they are spaced apart to permit the cutting edge 24 to pass therebetween to reach the receiving surface 28.

Figure 2:
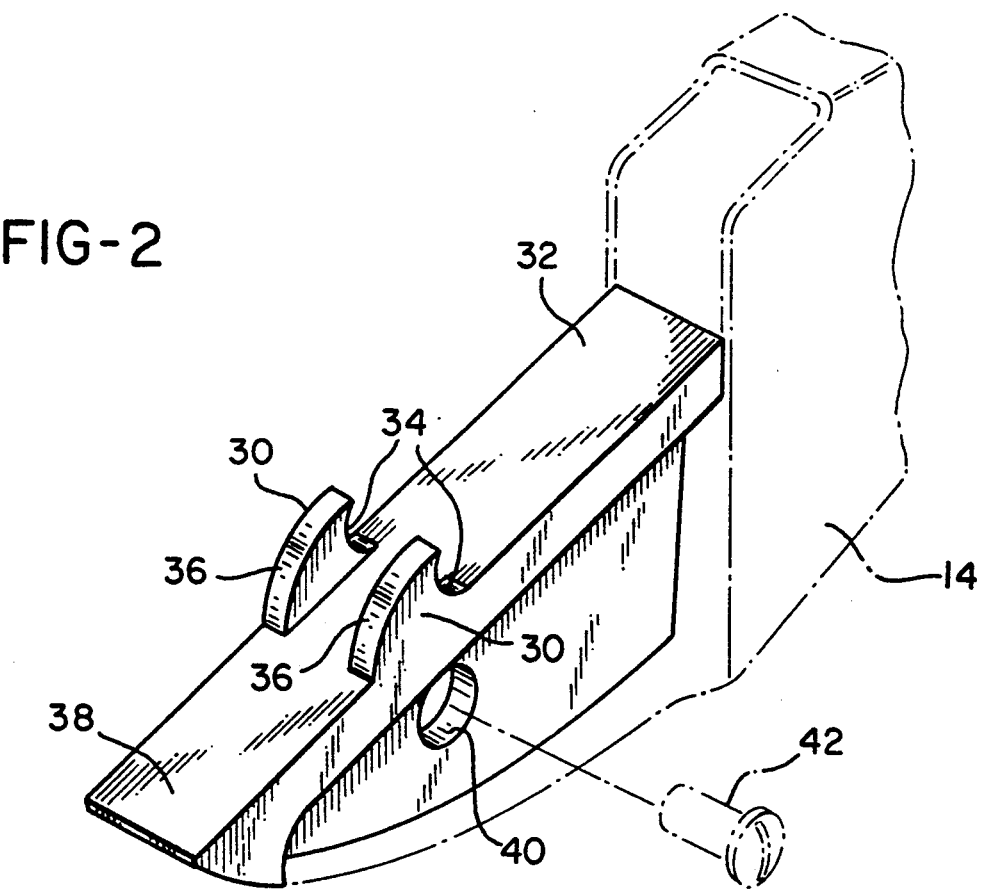
FIG. 2 is a perspective view of an anvil for use in a nipper in accordance with the present invention.

Seen best in FIG. 2, the locator lugs 30 are preferably shaped like a hook, with a curved, concave surface 34 facing the closed end 20 of the jaw opening 18, and a curved convex surface 36 facing the open end 22 of the jaw opening 18. Alternatively, the locator lugs 30 may have other shapes on each surface. For example, the surfaces of the locator lugs 30 facing the closed end 20 of the jaw opening 18 may be straight, textured for enhanced frictional contact, or simply concave. The surfaces of the locator lugs 30 facing the closed end 20 of the jaw opening 18 may also be referred to as restraining surfaces.

The locator lugs 30 perform several functions in accordance with the present invention. Initially, as the jaw opening 18 to the first cutting area 32 is partially blocked, only sticks, stems and branches 16 of a predetermined size are admitted into the first cutting area 32. Thus, sticks, stems and branches 16 which are too large to cut effectively with the nipper 10 are not engaged. As may be further seen in FIGS. 1 and 3, the locator lugs 30 further define a second cutting area 38 near the open end 22 of the jaw opening 18. While the jaw opening 18 may accommodate oversized sticks, stems or branches 16, the locator lugs 30 are preferably positioned to limit the receiving surface 28 of the anvil 26 in the second cutting area 38 and, thus, also substantially prevent engaging sticks, stems and branches 16 in the second cutting area 38 which are too large to be effectively cut by the nipper 10.

The locator lugs 30 are preferably positioned substantially nearer the open end 22, so that the portion of the receiving surface 28 within the first cutting area 32 is in the range of 40 to 90%, depending on the application. Alternatively, the locator lugs 30 may be located in other positions along the anvil between the closed and open ends 20, 22 of the jaw opening 18. Further, it is preferred that the locator lugs 30 extend into the jaw opening 18 to effectively block approximately 10 to 15% of the jaw opening 18. Alternatively, the present invention will still be effective in performing as intended where the locator lugs 30 are of different heights and block more or less of the jaw opening 18, as required for the application.

Once sticks, stems and branches 16 pass into the first cutting area 32, the locator lugs 30 allow the sticks, stems and branches 16 to bias against them for cutting. The preferred shape of the locator lug 30 enhances retention of a stick, stem or branch 16 in the first cutting area 32. The locator lugs 30 further serve to position the sticks, stems and branches 16 on the anvil 26 for cutting. Larger sticks, stems or branches 16 in the first cutting area 32 are positioned towards the closed end 20 of the jaw opening 18, while smaller sticks, stems and branches 16 are nearer the open end 22. As shown in the preferred embodiment of FIG. 1, the first and second jaws 12, 14 of the nipper 10 produce a higher cutting force near the closed end 20 and a lower cutting force near the open end 22 of the jaw opening 18. Thus, the locator lugs 30 serve to position the larger sticks, stems and branches 16 for engagement with higher applied cutting forces, and prevent them from squirting out.

The present invention may, alternatively, be used in other nipper structures which apply a constant force along the anvil 26 for pruning and cutting of sticks, stems and branches 16. Such structures, for example a Model P10 Anvil Pruner, available from the True Temper Hardware, Harrisburg, Pa., may be modified to include the anvil 26 and locator lugs 30 of the present invention. As applied to such structures, the locator lugs 30 provide a more limited function, serving to partially block the jaw opening 18 to limit the size of sticks, stems, and branches 16 entering in the first cutting area 32, as well as enhancing their retention there for cutting.

Referring now to FIGS. 1 and 2, in accordance with the present invention, it is preferred to manufacture the anvil 26 as a separate piece or insert for attachment to the second jaw 1 14 of the nipper 10. Any means for attaching known in the art is suitable. As shown in FIG. 2, the anvil 26 preferably includes a hole 40 to receive a fastener 42, such as the rivet shown in FIG. 1. Alternatively, as shown in FIG. 3, the anvil 26 is produced integrally with the second jaw 14 as a single piece, obviating the need for a fastener 42.

The anvil 26 and locator lugs 30 of the present invention are preferably formed as a single piece of a wear and cut-resistant polymer resin. Either polybutylene terephthalate which is commercially available under the name Valox® from General Electric, or nylon resin which is commercially available from DuPont de Nemours, Wilmington, Del. is preferred. Such resins may further be glass fiber reinforced. Other engineering resins and materials, fiber reinforced or not, may also be used, for example, acetal homopolymer commercially available under the name Delrin® from DuPont de Nemours, or acetal copolymer commercially available under the name Celcon® from Hoechst Celanese, Chatham, N.J.

While reference is made to sticks, stems and branches 16 herein, it is understood that such reference is representative of the entire range of matter, such as twigs, shoots, leaves and the like, which may be encountered by gardeners and homeowners engaged in cutting and pruning tasks.

While certain representative embodiments and details have been shown for purposes of illustrating the invention, it will be apparent to those skilled in the art that various changes in the apparatus disclosed herein may be made without departing from the scope of the invention, which is defined in the appended claims.

What is claimed is:

1. A nipper for pruning sticks, stems and branches comprising opposing first and second jaws for engaging a stick, stem or branch for cutting, said first and second jaws defining a jaw opening therebetween having an open end and a closed end, wherein:

said first jaw includes at least one cutting edge; and
said second jaw includes an anvil having:
- a receiving surface for said at least one cutting edge; and
- at least one fixed locator lug extending from said receiving surface into said jaw opening to block a portion of said jaw opening, said at least one locator lug spaced between said open end and said closed end to define a first cutting area extending to said closed end, said locator lug having a restraining surface generally facing said closed end to restrain a stick, stem or branch in said first cutting area against movement towards said open end due to cutting forces applied by said cutting edge;

whereby a stick, stem or branch of limited size is admissible between said first jaw and said at least one locator lug into said first cutting area and is restrained there by said at least one locator lug for cutting.

2. The nipper of claim 1 wherein:
said anvil comprises two locator lugs spaced apart on said receiving surface such that said at least one cutting edge passes therebetween; and
said locator lugs block at least approximately 10% of said jaw opening.

3. The nipper of claim 1 wherein said at least one locator lug is shaped like a hook to enhance retention of a stick, stem or branch in said first cutting area.

4. The nipper of claim 1 wherein said at least one locator lug has a concave surface generally facing said closed end to enhance retention of a stick, stem or branch in said first cutting area.

5. The nipper of claim 4 wherein said concave surface is textured to provide frictional resistance to movement of a stick, stem or branch in contact therewith.

6. The nipper of claim 1 wherein:
said opposing first and second jaws cooperate to produce a cutting force which is higher near said closed end of said jaw opening and lower near said open end of said jaw opening; and
said restraining surface is shaped to restrain a stick, stem or branch in said first cutting area against the highest cutting force which may be imposed thereon.

7. The nipper of claim 1 wherein said at least one locator lug further defines a second cutting area between said at least one locator lug and said open end.

8. The nipper of claim 1 wherein said anvil comprises an separable insert, and said second jaw further comprises means for connecting said anvil to said second jaw.

9. The nipper of claim 1 wherein said anvil is formed integrally with said second jaw and said at least one locator lug is positioned such that only said restraining surface of said locator lug contacts a stick, stem or branch in said first cutting area for restraint thereof.

10. The nipper of claim 1 wherein said anvil is made of a polymer resin.

11. The nipper of claim 1 comprising two locator lugs positioned generally equidistant between said closed and opened ends.

12. A nipper for pruning sticks, stems and branches, comprising opposing first and second jaws for engaging a stick, stem or branch for cutting, said first and second jaws defining a jaw opening therebetween having an open end and a closed end, and cooperating to produce a cutting force which is higher near said closed end of said jaw opening and lower near said open end of said jaw opening, wherein:
said first jaw includes one cutting edge; and
said second jaw includes an anvil having:
a receiving surface for said cutting edge; and
two fixed locator lugs extending from said receiving surface into said jaw opening to block a portion of said jaw opening, and wherein:
said locator lugs are spaced apart on said receiving surface such that said cutting edge passes therebetween;
said locator lugs are spaced between said open end and said closed end to define a first cutting area extending between said locator lugs and said closed end;
said locator lugs each have a restraining surface generally facing said closed end to restrain a stick, stem or branch in said first cutting area against movement towards said open end due to cutting forces applied by said cutting edge;
said locator lugs are positioned such that only said restraining surfaces of said locator lugs, which are shaped to restrain a stick, stem or branch in said first cutting area against the highest cutting force which may be imposed thereon, contact a stick, stem or branch for restraint thereof;
whereby a stick, stem or branch of limited size is admissible between said first jaw and said locator lugs into said first cutting area and restrained there by said locator lugs for cutting, and larger ones of said sticks, stems or branches admissible into and restrained in said first cutting area are positioned closer to said closed end by the presence of said locator lugs, and thereby subjected to higher applied cutting force by said cutting edge.

13. The nipper of claim 12 wherein said locator lugs are shaped like a hook, having a concave surface generally facing said closed end to enhance retention of a stick, stem or branch in said first cutting area, and having a convex surface generally facing said open end.

14. The nipper of claim 12 wherein said locator lugs block at least approximately 10% of said jaw opening.

15. An anvil for use in a nipper for pruning sticks, stems and branches, said nipper including a first jaw having at least one cutting edge, and includes a second jaw in opposing relationship thereto having said anvil for engaging a stick, stem or branch for cutting, said first and second jaws defining a jaw opening therebetween having an open end and a closed end, wherein said anvil comprises:
a receiving surface for receiving said at least one cutting edge during cutting; and
at least one fixed locator lug extending from said receiving surface into said jaw opening to block a portion of said jaw opening, said at least one locator lug spaced between said open end and said closed end to define a first cutting area extending to said closed end, said locator lug having a restraining surface generally facing said closed end to restrain a stick, stem or branch in said first cutting area against movement towards said open end due to cutting forces applied by said cutting edge;
whereby a stick, stem or branch of limited size is admissible between said first jaw and said at least one locator lug into said first cutting area and restrained there by said at least one locator lug for cutting.

16. The anvil of claim 15 wherein:
said at least one locator lug comprises two fixed hook-shaped locator lugs spaced apart on said receiving surface such that said at least one cutting edge passes therebetween; and
said locator lugs are positioned such that said restraining surfaces comprise concave surfaces of said hook-shaped locator lugs shaped to restrain a stick, stem or branch in said first cutting area against the highest cutting force which may be imposed thereon.

17. The nipper of claim 16 wherein said locator lugs block at least approximately 10% of said jaw opening.

* * * * *